United States Patent [19]

LaBar et al.

[11] 4,148,777

[45] Apr. 10, 1979

[54] BINDER FOR FOUNDRY PROCESS

[75] Inventors: Russell A. LaBar, Grafton; Jordan J. Kopac, Franksville, both of Wis.

[73] Assignee: Delta Oil Products Corporation, Milwaukee, Wis.

[21] Appl. No.: 794,979

[22] Filed: May 9, 1977

[51] Int. Cl.² .......................... B22C 1/22; C08G 8/28; C08G 18/28

[52] U.S. Cl. .................................... 260/37 N; 164/43

[58] Field of Search .............. 260/38, 37 N, DIG. 40, 260/47 CB, 59 R; 164/43

[56] References Cited

U.S. PATENT DOCUMENTS

| | | | |
|---|---|---|---|
| 2,374,136 | 4/1945 | Rothrock | 260/75 NB X |
| 2,806,006 | 9/1957 | Proctor | 260/2.5 AM |
| 2,843,568 | 7/1958 | Benning et al. | 260/37 N X |
| 3,063,964 | 11/1962 | Khawam | 260/2.5 AM X |
| 3,282,896 | 11/1966 | Einberg | 260/59 R X |
| 3,403,721 | 10/1968 | Robins et al. | 106/38.6 X |
| 3,409,579 | 11/1968 | Robins | 260/30.4 |
| 3,428,110 | 2/1969 | Walker | 106/38.6 X |
| 3,485,797 | 12/1969 | Robins | 260/59 R X |
| 3,632,531 | 1/1972 | Rush et al. | 260/59 R X |
| 3,702,316 | 11/1972 | Robins | 260/DIG. 40 |

OTHER PUBLICATIONS

Saunders and Frisch, *Polyurethanes:Chemistry and Technology*, Pt. I., vol. XVI, pp. 208-215.

Primary Examiner—Sandra M. Person
Attorney, Agent, or Firm—Cook, Wetzel & Egan, Ltd.

[57] ABSTRACT

An improved binder composition for use in the foundry process comprises a mixture of low molecular weight essentially mononuclear methylolated phenols which are cured through a reaction with a polyisocyanate. In the preferred embodiment, a minor amount of polyether polyol, a mutual solvent and a catalyst, preferably an amine catalyst, is mixed with the phenolic component.

24 Claims, No Drawings

BINDER FOR FOUNDRY PROCESS

The present invention relates to binder compositions, and particularly to binder compositions used in the foundry art for making cores and molds which are hardened at room temperature.

More particularly, the present invention relates to a foundry binder comprising a mixture of low molecular weight, essentially mononuclear methylolated phenols, which can be mixed with sand or other aggregates, and cured with polyisocyanates, preferably in the presence of a catalyst. The binder compositions of the present invention may be cured through the use of gaseous curing agents or non-gaseous catalyst mixed with the binder or incorporated into the foundry mix.

BACKGROUND AND PRIOR ART

In the foundry art, molds and cores used in making metal castings are prepared from an aggregate such as sand and a curable binder. In recent years, the curable binders of the no-bake type, i.e., those requiring little or no additional heat other than that available at ambient temperatures, have gained wide acceptance in foundry practice. The numerous advantages of these no-bake systems are well known to those skilled in the foundry art. Typically, to be useful as a no-bake binder, the system must have a sufficient bench or work life, must impart a rapid stripping strength to the cores and must develop good tensile strength when completely cured at room temperature. In addition, the binder system should work equally well on all foundry aggregates, be relatively insensitive to moisture and give castings without surface defects with all metal types.

Although phenol-formaldehyde resins have been crosslinked with diisocyanates for many years in the coatings and adhesives industries, it has been only relatively recently that phenol-formaldehyde resins crosslinked with isocyanates have been used in the foundry process for mold and core making.

U.S. Pat. Nos. 3,409,579; 3,432,457; 3,485,797; 3,676,392; 3,702,316; and 3,726,867 teach the use of special phenol-formaldehyde resin which contain benzylic ether linkages (Figure I, portion m) which are prepared at temperatures in excess of 100° C. with special divalent metal ion catalysts.

FIG. I

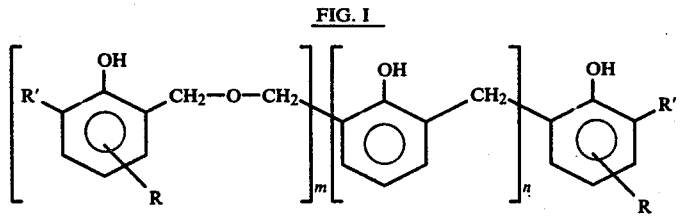

These special resins are described as high molecular weight phenolic resins containing more dimethylene ether linkages than methylene linkages between the phenol rings, i.e., m is greater than n in Figure I, and the number of repeating aromatic rings is preferably 4 to 10. In addition these resins were described as being essentially anhydrous in that they contain less than 5% and preferably less than 1% water.

The production of phenolic resole mixtures are normally prepared using an alkaline catalyst such as sodium hydroxide with a molar ratio of formaldehyde to phenol greater than one. This reaction can be divided into two temperature ranges; (1) reaction temperatures in excess of 90° C., which yields conventional resole resins containing methylene bridges [Figure II],

FIG. II

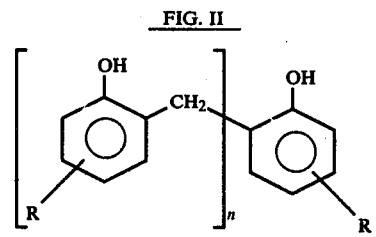

wherein the average n is typically 2 or more, and (2) reaction temperatures less than 90° C. The latter temperature condition will yield low molecular weight materials where the degree of advancement will depend on the actual temperature used and the length of the reaction. The molecular weight of these low temperature alkaline-catalyzed one-step phenolic mixtures is a function of the degree of reaction. These materials may range from mixtures of mononuclear methylolated phenols of the type shown in Figure III with molecular weights of 125-150, and up to resins with molecular weights of 1,000 or greater, depending upon time of reaction.

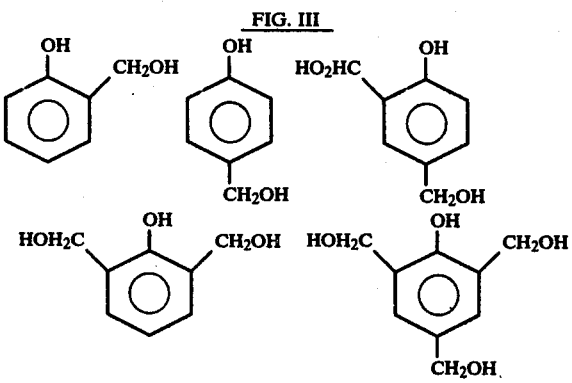

FIG. III

THE PRESENT INVENTION

We have found that very low advanced phenolic mixtures containing up to 20% water when used in conjunction with polyether polyols and reacted with polymeric isocyanates in the presence of amine and metal salt catalyst form excellent foundry shapes with standard aggregates. Most surprising is the discovery that mixtures of mononuclear methylolated phenols when used in the manner described below gives enhanced properties desired in the production of foundry cores and molds. These results were totally unexpected.

The present invention contemplates the use of mixtures of low molecular weight methylolated phenols, which are essentially mononuclear in nature as a sand binder for use in the foundry process, as described above, wherein they are cured by polymeric isocyanates and a catalyst. The mixture of methylolated phenols used in the present invention are mononuclear in the sense the mixture is essentially free of dinuclear or higher species, i.e., they are substantially free of phenol formaldehyde condensation products which include two or more benzene rings.

While it is preferred, for purposes of the present invention, to have a mixture of low molecular weight methylolated phenols which are substantially free of dinuclear or polynuclear forms, as a practical matter it is difficult to produce the methylolated phenols which are absolutely free of dinuclear or polynuclear forms using a commercially realistic process. While the preferred process, described below, produces essentially pure mononuclear-type methylolated phenols in the sense that dinuclear and polynuclear species are at or below the threshold of detection using conventional NMR techniques, i.e., about 3 mole percent of dinuclear or polynuclear form, the present invention contemplates the use of methylolated phenol mixtures containing as much as 15 or 20 mole percent of such dinuclear or other polynuclear species. Even in those cases where the mixture of methylolated phenols comprises as much as 20 mole percent dinuclear or polynuclear species, it is contemplated that substantially less than 10% of the mixture, on a mole percent basis, would be considered conventional resole resins, i.e., 3 or more benzene rings per molecule. In other words, most of the polynuclear species would be dinuclear. As a result, it is contemplated that the average molecular weight of the methylolated phenol mixture must be less than 200 and preferably less than 175.

The methylolated phenol mixture of the present invention preferably contains water and may contain as much as 20% by weight of water. It has been found that the low molecular weight modified phenols are highly dilutable by water, and water may be used to replace conventional organic solvents, of the fugitive type, and to reduce the viscosity of the methylolated phenol mixture. The present invention contemplates that the mononuclear methylolated phenol mixtures of the present invention may be mixed with ordinary organic solvents, of a urethane grade, of the type that are usually used in the production of polyurethanes in lieu of water. However, water is preferred, in accordance with the present invention, because of economic reasons the water is readily available at a lower cost than a corresponding amount of solvents, and accomplishes the same purpose of producing a more mixable, lower viscosity system.

It has also been found that the mixture of methylolated phenols are more miscible with water than are an equivalent amount of unreacted phenol, thus suggesting the methylolated groups improve the miscibility of the methylolated phenols and water.

The use of water also eliminates any problems with air pollution or the like in using the binder resin system in the foundry. Still further, it has been observed that the presence of a certain amount of water in the phenolic mixture produces a resin which will cure quicker, i.e., have a faster rate of tensile buildup. It is speculated that the water, which contains Zwitteroff hydrogen ions, reacts with the isocyanate to produce various types of amine compounds and intermediates containing amino nitrogens, which in turn catalyzes the reaction of the isocyanate and the methylolated phenols.

In the practice of the present invention it is also preferred that the mixture of methylolated phenols and water contain at least some electrolyte salts dissolved in the system. It has been found that the presence of electrolyte salts promotes the solubility of the methylolated phenol-water mixture and reduces the requirement for organic solvents.

The preferred methylolated phenolic mixtures of this invention may be conveniently prepared in the presence of alkali base such as sodium hydroxide, potassium hydroxide and the like at a pH greater than 7 and less than 11 and preferably between 7.5 and 9.5. The molar ratio of formaldehyde to phenol should be greater than one and less than two with the preferred ratio between 1.1 and 1.6. The methylolated phenolic mixture should be prepared at reaction temperature less than 90° C. and preferably between 65° and 80° C. At these temperatures, the minimum reaction time is the time required to react greater than 90% of the formaldehyde. Any water in excess of 20% in the reaction mixture is removed by vacuum distillation at temperatures of less than 75° C. and preferably between 50°-60° C. These conditions give a highly desirable isomeric mixture of methylolated phenols.

Although the preferred process for producing the methylolated phenol mixture of the present invention is described above, it is generally contemplated that a suitable mixture of methylolated phenol monomers may be produced by a wide variety of processes. Generally it is believed desirable to produce the reaction in an aqueous medium with a basic catalyst. For instance, such catalysts as calcium oxide, although having a limited solubility, may be used. Generally, the pH should be above 7, although a pH level between 4 and 7 can be used, but it is not desired since this pH range causes problems with the monomeric species advancing to polymeric species due to the lower rate of methylolation at this pH range. Generally speaking, catalysts may be any water-soluble base and while temperatures of 65°-80° C. are preferred, any temperatures less than 90° may actually be used. Room temperature processes are effective to produce a desired mixture, but are not preferred commercially because they are too slow, i.e., they tie up capital equipment for an extended period of time. Generally the kinetics of the reaction at low temperature and at high base favors a first substitution of the methylol group on the phenol, while advancement is temperature controlled, rather than catalyst induced. Since the reaction is exothermic, it is necessary to keep the reaction temperature relatively low in order to have a well controlled distribution of monomeric type methylolated phenols.

After the desired reaction has been completed, it is necessary to neutralize the reaction product to a pH somewhere near 5, but reducing the pH below pH 4 tends to produce a novolac type resin wherein advancement is the favored reaction. While it is generally desired to strip the water level down to 20% by weight or less, if the reaction is started using paraformaldehyde, it may be possible to avoid any stripping reaction or stripping step.

Although it is not considered to be commercially practical, the present invention contemplates the production of suitable mixtures of methylolated phenols by mixing separately produced monomeric species or mixtures of monomeric species.

The resultant phenolic mixtures will consist primarily of methylolated phenols shown in Figure III. In practice an aqueous complex monomeric mixture results. Some higher molecular weight species having the general formula shown in Figure II where R is hydrogen or a methylol group may be present, but these more advanced moities should not comprise more than 20 mole percent of the phenolic mixture. The overall composition should have an average of less than two benzene rings per molecule, i.e, the average "n" in Figure II should be less than 1.

Experiments run on mixtures of individual pure methylolated phenol monomers of the structure shown in Figure III, show that such mixtures may be combined with water, salts and solvent, and are reacted with polyisocyanates to form an excellent binder system for foundry aggregates. These low molecular weight aqueous systems exhibit low viscosity and give fast strip times, rapid tensile build-up and a dramatic improvement in the ability of the finished core or mold to be removed from the core or mold box. In fact, these experimental mixtures demonstrate that the presence of higher molecular weight fractions are detrimental to these end use properties.

The low molecular weight phenolic mixtures produced by the methylolation process described above are usually prepared in the presence of water and are water soluble. We have found that the usable mixtures of the present invention should contain at least 5% and not more than 20% water. Preferably the water content of the phenolic mixture should be 7–12%. Higher water levels tend to reduce the effective solids of the mixture.

The aqueous phenolic mixtures of the present invention can be advantageously combined with polyether polyols to produce a binder composition which can be reacted with polyisocyanates, to give crosslinked, thermoset resins which may be employed as coating and adhesives. More particularly, the phenolic mixtures, either with or without added polyol, of the present invention may be used with sand or other aggregates to make foundry articles of suitably high tensile strength and good mechanical properties.

While it is generally desired to use polyols as a portion of the binder system as described above, polyols are not essential, since the methylolated phenol mixtures described herein can produce tensiles strengths in excess of 200 psi without any added polyol. However, it has been found that the polyols tend to improve the ultimate tensile strength, and the polyol may also function as an additional solvent, and reduce the overall viscosity of the binder system. The use of polyol creates a binder which produces a more readily strippable core or mold, i.e., the cured sand-binder product is somewhat flexible and can be more easily removed from the box in which it is produced. The "strippability" of a core is very difficult to demonstrate, and applicants are not aware of any test by which this can be measured, but it has been observed in the foundry. It is believed that the presence of a polyol prevents the system from becoming rigid too early and thus provides a core or mold with a certain amount of flexibility for a few minutes after the curing has taken place. The polyol thus appears to slightly retard the rate of initial tensile build-up, but it does appear to contribute to the ultimate tensile strength.

The polyether polyols which may be used in the binder compositions must be poly-hydroxyfunctional liquids having a molecular weight between about 75 and 5,000. Polyether polyols used in the present invention may be prepared by reacting alkylene oxides such as ethylene oxide or propylene oxide with such precursors as propylene glycol, 1,4-butane diol to form poly(oxyalkylene) glycols, or poly(oxypropylene)-poly(oxyethylene) glycol block copolymers which may be hydroxyl terminated, or with triols such as glycerin, trimethylol propane, trimethylol ethane and castor oil to form the corresponding polyoxypropylene or polyoxyethylene adducts. Tetrols or compounds of higher functionality also may be similarly reacted. Also, polymers and copolymers prepared from hydroxyl alkyl acrylates or methacrylates with other ethylenically unsaturated monomers, poly(oxypropylenepoly(oxyethylene) and adducts of pentaerythritol or glycerin may be suitable in this invention.

The relative ratio of polyol to methylolated phenol mixture may vary over substantial limits, depending upon the exact end use to which the composition is to be used. However, it is generally desired to use at least 10% by weight of the polyether, based on the weight of the phenolic mixture in order to achieve improved strippability of the core from the core box and increased ultimate tensile, and as much as 40% by weight of the polyether based on the weight of the phenolic resin may be advantageously used. Higher than 40% can be used, but, as the amount of polyether approaches the weight of the phenolic resin, i.e., approaches 100%, the hot strength of the foundry shapes may be reduced to undesirably low levels.

As was mentioned above, it is generally desired to include a solvent in the binder composition in order to lower the viscosity and provide for increased mixability with the sand. The particular type of solvent which is used is not critical, so long as the solvent is inert with respect to the methylolated phenol mixture and the polyether polyol. It is preferred to use a solvent or a solvent mixture which is compatible with the phenolic mixture, the polyether polyol, and the polyisocyanate. A mixture of moderately polar solvent and aromatic solvent, as is illustrated by the examples below, is preferred for economic reasons. Suitable aromatic solvents include benzene, toluene, xylene, ethyl benzene, naphthalene and the like. Suitable moderately polar solvents include butyl Cellosolve acetate, butyl carbitol, diacetone alcohol, furfural, and the like.

The quantity of solvent used will depend in part on the molecular weight of the polyether polyol being employed. Therefore the quantity of solvent used in the binder composition may vary over wide limits. The examples below illustrate compositions made up of approximately 55 parts by weight of methylolated phenol mixture, 15 parts by weight of polyether polyols and 30 parts by weight of solvents.

The binder comosition consists of a major proportion of a phenol-formaldehyde reaction mixture which is described in detail above. This monomeric methylolated phenol mixture contains at least 5% and not more than 20% water. It is generally preferred to combine the monomeric methylolated phenol mixture with a minor portion of polyol to form the binder composition.

In applying the binder compositions of the present invention to the foundry process, it is generally preferred to prepare three separate components, namely:
  A. binder composition;
  B. isocyanate solution; and
  C. catalyst solution.

The preferred practice is to use solvents in all three components in order to insure easy mixing of the components with the sand and promote a uniform mixture of the foundry sand with all of the components, although it is possible to use some or all of the components without organic solvents, provided the viscosity of such components is adequate to accomplish the required mixing to produce a uniform product.

Generally the foundry process is carried out, by first mixing binder composition with the desired amount of aggregate material (typically sand) for use in producing foundry cores and molds. If desired, the catalyst solution may be mixed with the sand at the same time the binder composition is mixed. Alternatively the binder composition and the catalyst may be pre-mixed together or mixed with the sand sequentially, in either order. Next, an appropriate quantity of isocyanate solution is added to the sand-binder mixture and mixed for a time sufficient to produce a uniform foundry sand mix which is then shaped into desired articles by ramming or blowing into a pattern. The foundry sand mix rapidly cures at room temperature in the shape of the pattern as the isocyanate solution reacts with the binder composition.

In the preparation of isocyanate solution of the present invention, numerous polyisocyanates, including di- and triisocyanates may be employed. Suitable isocyanates are the aromatic, aliphatic and cycloaliphatic isocyanates and include triphenyl-methane triisocyanate; naphthalene diisocyanate; 4-tert-butyl-m-phenylene diisocyanate; 4,4'-methylene bis(o-tolyl isocyanate); 4,4'-methylene bis(phenyl isocyanate); m-phenylene diisocyanate; 4-chloro 3,3-phenylene diisocyanate; 4,4'-biphenylene diisocyanate; 1,5-naphthylene diisocyanate; 1,4-tetramethylene diisocyanate; 1,10-decamethylene diisocyanate; 1,4-cyclohexylene diisocyanate; 4,4'-methylene bis(cyclohexyl isocyanate); 1,5-tetrahydronaphthylene diisocyanate; toluene-2,4-diisocyanate; 4-chloro-1,3-phenylene diisocyanate; ethylene diisocyanate; ethylidene diisocyanate; propylene 1,2-diisocyanate; cyclohexylene-1,2-diisocyanate; 3,3'-dimethylbiphenylene-4,4'-diisocyanate; 3,3'-dimethoxybiphenylene-4,4'-diisocyanate; 3,3'-diphenylbiphenylene-4,4'-diisocyanate; 3,3'-dichlorobiphenylene-4,4'-diisocyanate; triphenylene p-p',p"-triisocyanate; furfurylide diisocyanate; benzene triisocyanate; hexane-1,2,6-triisocyanate; 2,2,4-trimethylhexamethylene diisocyanate; methyl-2,6-diisocyanatocaproate; 4-methyl-1,3-diisocyanatocyclohexane; 4,4'-methylene bis(cyclohexyl isocyanate); methane diisocyanate; N,N'N"-tris(6-isocyanatohexamethylene)biuret; 1-chloro-2,4-diisocyanatobenzene; tris(4-isocyanatophenyl) methane; naphthalene diisocyanates; bis(2-isocyanatoethyl) benzene; isophorone diamine diisocyanate; triphenylsulfone triisocyanate; trimethylbenzene-2,4,6-triisocyanate; 1-methylbenzene-2,4,6-triisocyanate; diphenyl-2,4,4'-triisocyanate; and 1,6-hexamethylene diisocyanate. The isocyanate part of the present invention is desirably used as a solution in a suitable solvent because the reduced viscosity improves the uniformity of the sand coating. It is possible to use the isocyanate without a solvent.

The binder compositions of the present invention may be cured either with or without a catalyst, but it is preferred to use a catalyst. Conventional catalysts which promote the urethane-forming reaction, including those which are liquid and those which are gaseous, may be used. The preferred catalyst system comprises an amine catalyst in combination with a small amount of organo-metallic cocatalyst.

When a liquid catalyst system is to be used, the main catalyst may comprise any of the standard soluble urethane amino-type catalysts, although certain heterocyclic tertiary amines are preferred. In particular, 4-picoline and 4-phenyl propyl pyridine are the preferred amine catalysts which most preferably are used in combination with a small amount of an organo-metal catalyst, such as dibutyl tin dilaurate. Other amines which may be used include dimethylethanolamine, diethyl cyclohexylamine, dimethylanaline, pyridine, triethyl amine, N-methyl morpholine, tetramethyl 1,3-butanediamine 1-methylimidazole, imidazole and the like. Organo-metal compounds which may be used include dibutyl tin diacetate, the various metal naphthanates such as tin, lead, cobalt, iron, manganese and the like, phenyl mercuryl proponate and similar mercuric compounds. Further suitable and useful catalysts are listed in "Polyurethane, Part I", Saunders and Frisch, page 212 (Interscience Publishers, 1962).

In those cases wherein the binder is substantially free of organic solvents, it is important to use a catalyst for the urethane reaction which is soluble in the system. It is contemplated that water soluble amine catalyst such as Dabco are the preferred catalysts for use in the binder systems which are substantially free of organic solvents.

As is shown in the accompanying examples, it is preferred to use the amine catalyst as the main catalyst in the presence of from about 0.5 to about 5% by weight of the organo-metallic co-catalyst, based on the weight of the amine catalyst.

The present invention also contemplates the use of gaseous amines to cure the binder compositions of the present invention, but methylolated phenol mixtures of low water content are preferred for this use. Preferably the gaseous amine is a tertiary amine such as trimethylamine, although normally liquid tertiary amines such as triethylamine may be used if they are maintained in a suitably volatile form or are suspended in a gaseous medium and then passed through the mold or core. Dimethylethanol amine, triethanol amine, or other amines which have functional groups which do not interfere with the catalytic action of the amine may also be used. The gaseous amines may be used either with or without the organo-metallic co-catalyst. In the event the organo-metallic co-catalyst is to be used, it is preferably premixed with the sand and the binder composition, followed by mixing with the isocyanate solution. In this way, when the gaseous amine catalyst is brought in contact with the foundry mix, the organo-metallic co-catalyst will already be in position, thereby enabling a prompt reaction and curing of the binder composition.

The quantity of catalyst used should be regulated to obtain the cure and strip time desired for the foundry object being produced. This depends, in part, on the quantity of binder composition used with each measure of sand and in part on the size of the core or mold being produced. Desirably the binder is kept as low as possible for economical reasons, in keeping with achieving the required tensile strength to promote stripping and the required hot strength. Although useful cores and molds may be made using less than 1% by weight of binder compositions (exclusive of solvents), based on the weight of the sand, larger amounts may be added if higher tensile strength is required. Generally from about 0.5% to about 5% by weight of the binder composition based on the weight of the sand or other aggregates gives useful results.

It has been demonstrated that mononuclear methylolated phenol mixtures containing 20 or 25% of di- and polynuclear species produces a product having a lower short-term tensile, i.e., a poor tensile build-up. After one hour, the tensile strength of such a mixture is approximately 50% of the tensile strength of a similar mononuclear methylolated phenol mixture which is substantially free of di- and polynuclear species. Further, the presence of the di- and polynuclear species shows a loss of work time or a worse ratio of work time to strip time. It has been found that the mononuclear methylolated phenolic mixture described and claimed herein produces unexpected results in that the tensile build-up is very rapid, particularly when measured 15 and 30 minutes after cure and the mixture produces a system which has a very desirable ratio of work time to strip time. Further, it is a low viscosity system which may be used without fugitive solvents.

The following examples serve to illustrate the preparation and use of several binder compositions and catalyst systems within the scope of the present invention. These examples also present comparative data outside the scope of the present invention, but it is understood that these examples are set forth merely for illustrative purposes and many other binder compositions and catalyst systems are within the scope of the present invention.

EXAMPLE 1

Into a 2,000 ml glass resin kettle equipped with a reflux condenser, an agitator and a thermometer is charged 500 g (5.32 moles) of phenol and 518 g (6.39 moles) of a 37% aqueous formaldehyde solution. To the stirred reaction mixture is slowly added over 10 minutes, 20 g of a 50% aqueous NaOH solution. The reaction mixture is heated under reduced pressure to approximately 70° C. At this point the reaction exotherms to 75° C. The reaction temperature is held at 75° C. until the free formaldehyde is less than 1.5% as determined by the hydroxyl amine method. The reaction mixture is cooled to approximately 50° C. and the pH is adjusted to 4.5 to 5.5 by the addition of an aqueous paratoluene sulfonic acid solution. Vacuum is again applied and excess water is removed at temperatures between 50°–55° C. until the water content of the phenolic mixture is approximately 10%. The methylolated phenol mixture contains less than 3 mole percent of biphenyl methylene protons in relation to the methylene protons in the methylol groups.

EXAMPLE 2

Using an aqueous phenolic mixture prepared by the procedure given in Example 1, a phenolic binder system was prepared.

| Material | Parts |
| --- | --- |
| Aqueous Phenolic Mixture | 55 |
| Polyoxypropylene glycol (Pluracol P410 from BASF Wyandotte Corp.) | 15 |
| Butyl Cellosolve Acetate | 22 |
| SC-100 (Aromatic Hydrocarbon solvent) | 8 |

An Isocyanate Solution was prepared as follows:

| Material | Parts |
| --- | --- |
| Rubinate M [Methylene bis (phenyl isocyanate)] | 85 |
| SC-100 (Aromatic Hydrocarbon solvent) | 15 |

A catalyst solution was prepared as follows:

| Material | Parts |
| --- | --- |
| 4-Phenyl propyl pyridine | 60 |
| Dibutyl tin dilaurate | 0.6 |
| SC-100 (Aromatic Hydrocarbon Solvent) | 40 |

A typical foundry sand mix was prepared according to the following formulation.

| | |
| --- | --- |
| AFS Sand | 2,000 g |
| Phenolic Binder System | 15 g |
| Isocyanate Solution | 15 g |
| Catalyst Solution | 0.75 g. |

The sand, phenolic binder system and catalyst solution are mixed in a Hobart Mixer for one minute. The isocyanate solution is then added and mixing is continued for an additional 45 seconds. The sand mix is then poured into a "dog bone" core box, packed and the excess sand is struck off into an open window box. The sand in the window box is packed and struck off.

The surface of the sand in the window box is checked every 15 seconds until a Green B hardness of 40 is reached. The bench life or work time is the time for isocyanate addition to the time a Green B hardness of 40 is reached. The strip time is determined in the same manner except a mold hardness (penetration) of 25 is defined as the strip time.

A foundry mix prepared in the above manner with the materials described has the following properties:

| | | | | Tensiles (psi) | |
| --- | --- | --- | --- | --- | --- |
| Work Time | Strip Time | WT/ST | 30 min. | 60 min. | 240 min. |
| 1' 45" | 2' 45" | 0.64 | 109 | 152 | 190 |

EXAMPLE 3

This example illustrates the deleterious effect of the presence of di- and polynuclear moieties in the phenolic component on the binder system. The materials and procedure are the same as in Example 2, except a typical resole resin was used. This resin is not within the scope of the present invention in that the resin contains approximately 45 mole percent of biphenyl methylene protons compared to the methylol methylene protons. The high molecular weight nature of this resole resin is reflected in its high viscosity. The use of the resole resin in the manner described above gave these results:

| | | | | Dog Bone Tensiles (psi) | |
| --- | --- | --- | --- | --- | --- |
| Work Time | Strip Time | WT/ST | 30 min. | 60 min. | 240 min. |
| 1' 40" | 3' 10" | .53 | 33 | 68 | 173 |

EXAMPLE 4

This example illustrates the effect of a low water resole prepared by standard procedures and used in the manner described in Example 2. The phenolic resole used in the phenolic binder solution contained 1.2% water. This material when used in the manner described in Example 1, gave the following results:

| Work Time | Strip Time | WT/ST | Dog Bone Tensiles (psi) | | |
|---|---|---|---|---|---|
| | | | 30 min | 60 min. | 240 min. |
| 1' 45" | 4' 45" | .36 | 69 | 103 | 130 |

Examples 2 through 4 are summarized in Table I.

Table I

| Exam. | % H₂O in Phen. Compon. | Visc. of phen. com. | Visc. of Phen. Bin. system(cps) | WT | ST | WT/ST | Dog Bone Tensile (psi)Min | | |
|---|---|---|---|---|---|---|---|---|---|
| | | | | | | | 30 | 60 | 240 |
| #2 | 8.6 | 222 | 120 | 1'45" | 2'45" | .64 | 109 | 152 | 190 |
| #3 | 7.7 | 11,400 | 330 | 1'45" | 3'15" | .54 | 33 | 68 | 173 |
| #4 | 1.2 | 12,800 | — | 1'45" | 4'45" | .37 | 69 | 103 | 130 |

EXAMPLE 5

A mixture was produced from individually pure monomers, as follows:

| Material | Parts | Source |
|---|---|---|
| Water | 10 | |
| Phenol | 17 | Aldrich Chemicals |
| Ortho-methylol phenol | 35.9 | Aldrich Chemicals |
| Para-methylol phenol | 16.0 | Aldrich Chemicals |
| Trimethylol | 9.9 | Synthesized by procedure given in U.S. Patent |
| Ortho, ortho-dimethylol phenol | 7.2 | Synthesized |
| 37% aqueous formaldehyde | 2 | |

The NMR of each monomer showed no presence of advance moieties, i.e., no biphenyl methylenes or benzylic ether protons were present. The above mixture was adjusted to pH 8.6 with a 50% NaOH solution and then adjusted to pH 4.5 with a 50% paratoluene sulfonic acid solution. Excess water was removed by vacuum distillation at temperatures less than 45° C. to a final water level of 14.9%. This monomer mix was then made into a phenolic binder system with polyol and solvent and used with a foundry aggregate as described in Example 2. A phenolic binder system made from a phenolic mixture prepared as described in Example 1 was run as a control.

| Sample | Work Time | Strip Time | FF* | Tensile | | | |
|---|---|---|---|---|---|---|---|
| | | | | 1 hr. | 2 hr. | 4 hr. | 24 hr. |
| Monomer Mix | 3' 15" | 7' 10" | .6 | 82 | 125 | 153 | 201 |
| Control | 3' 0" | 4' 0" | 1.1 | 91 | 102 | 165 | 193 |

*FF = free formaldehyde

EXAMPLE 6

To a sealed reaction kettle is added 2,153 lbs. of phenol and 1,602 lbs. of 50% aqueous formaldehyde. Over a 15 minute period 75 lbs. of 50% aqueous sodium hydroxide solution is added. Vacuum and heat are applied to the reaction kettle until an exotherm occurs at 75° C. The reaction mixture is held at 75° C. for 1 hr. 35 minutes and then cooled to 55° C. A 30% paratoluene sulfonic acid solution is added slowly until the pH reaches 4.7. The mixture is then vacuum distilled at approximately 62° C. for 4 hours and then cooled down.

EXAMPLE 7

An aqueous phenolic mixture was prepared according to Example 6. A phenolic binder system was prepared as follows:

| Aqueous phenolic mixture | 39 parts |
|---|---|
| Butyl Cellosolve Acetate | 11 parts |
| SC-100 | 4 parts |
| Methanol | 10 parts |

This binder system was mixed with an isocyanate solution, a catalyst solution and sand as described in Example 2. The following work time, strip time and tensile values were obtained.

| Work Time | Strip Time | WT/ST | Tensiles (psi) | | |
|---|---|---|---|---|---|
| | | | 1 hr. | 2 hr. | 4 hr. |
| 6' 30" | 8' 0" | 0.8 | 133 | 143 | 168 |

EXAMPLES 8-10

A phenolic binder system, made with a phenolic mixture from Example 6, an isocyanate solution and a catalyst solution were made up as described in Example 2. Foundry mixes were made up using 2,000 parts of wash and dried, reclaimed foundry sand, 15 parts of the phenolic binder system and 15 parts of isocyanate solution. Sand temperature and amounts of catalyst solution (based on the phenolic binder system) were varied. The work time, strip time and tensile build-up of the mixes are shown in Table II.

Table II

| Exam. | % Catalyst Solution | Sand Temp. (° F.) | Work Time | Strip Time | Dog Bone Tensiles | | |
|---|---|---|---|---|---|---|---|
| | | | | | 30 min | 60 min | 240 min |
| #8 | 7.5 | 70 | 2'15" | 4'25" | 110 | 136 | 167 |
| #9 | 7.5 | 85 | 2' | 3'50" | 138 | 155 | 185 |
| #10 | 4 | 110 | 2'20" | 3'30" | 132 | 152 | 182 |

While the present invention has been described in the context of a binder system used in the practice of the foundry process, it will be understood that the present invention may be applied to other arts wherein an adhesive-like material is required to bind solid material together. Those skilled in the art will be aware that many variations may be made on the present invention, both in and out of the foundry field. Those skilled in the art will be aware that forms of invention herein shown and described are to be considered only as illustrative. It will be apparent to those skilled in the art that numerous modifications may be made therein without departure from the spirit of the invention or the scope of the appended claims.

We claim:

1. The process of preparing shaped foundry products which comprises:
   (a) forming a foundry mix by uniformly distributing on a foundry aggregate containing sand as a major constituent a binding amount of up to 10% based on the weight of the aggregate of a binder comprising a mixture of low molecular weight mononuclear methylolated phenols substantially free of dinuclear and polynuclear species;
   (b) mixing therewith a polyisocyanate in a concentration of 10 to 500% by weight of the phenolic resin;
   (c) shaping the foundry mix in a mold; and
   (d) permitting said binder resin composition to react with sand polyisocyanate to form a thermoset copolymer and to bind the shaped foundry mix.

2. The process of claim 1, comprising the additional step of passing a gaseous tertiary amine through the shaped foundry mix.

3. The process of claim 1, wherein said binder comprises from 5 to 20% by weight of water, based on the weight of said mononuclear methylolated phenol mixture.

4. The process of claim 3, wherein said binder is substantially free of fugitive organic solvents.

5. The process of claim 3, wherein the foundry mix of (a) includes a tertiary amine catalyst.

6. The process of claim 5, wherein the tertiary amine catalyst is selected from the group consisting of 4-phenyl propyl pyridine and 4-picoline.

7. The process of claim 5, wherein an organo-metallic co-catalyst is added to the tertiary amine catalyst.

8. The process of claim 7, wherein the co-catalyst is an organo-tin compound.

9. The process of claim 8, wherein the co-catalyst is dibutyl tin dilaurate.

10. The process of preparing shaped foundry products which comprises:
    (a) forming a foundry mix by uniformly distributing on a foundry aggregate containing sand as a major constituent a binding amount of up to 10% based on the weight of the aggregate of a binder comprising a major portion of a mixture of low molecular weight mononuclear methylolated phenols, substantially free of dinuclear and polynuclear forms, and a minor proportion of a polyether polyol having an average molecular weight between about 75 and 5000 and having an average hydroxyfunctionality between about 2 and 4;
    (b) mixing therewith a polyisocyanate in a concentration of 10 to 500% by weight of the phenolic resin;
    (c) shaping the foundry mix in a mold; and
    (d) permitting said binder resin composition to react with said polyisocyanate to form a thermoset copolymer and to bind the shaped foundry mix.

11. The process of claim 10, said binder comprises from 5 to 20% by weight of water based on the weight of said mononuclear methylolated phenol mixture.

12. The process of claim 11, wherein said binder is substantially free of fugitive organic solvents.

13. The process of claim 11, wherein said foundry mix of (a) includes a tertiary amine catalyst.

14. The process of claim 13, wherein the tertiary amine catalyst is selected from the group consisting of 4-phenyl propyl pyridine and 4-picoline.

15. The process of claim 13, wherein an organo-metallic co-catalyst is added to the tertiary amine catalyst.

16. The process of claim 15, wherein the co-catalyst is an organo-tin compound.

17. The process of claim 16, wherein the co-catalyst is dibutyl tin dilaurate.

18. A process as described in claim 10, wherein the binder resin composition includes from about 10 to about 40% by weight of said polyol, based on the weight of said mononuclear methylolated phenol mixture.

19. The process of claim 18, wherein said binder is substantially free of fugitive organic solvents.

20. The process of claim 18, wherein said foundry mix of (a) includes a tertiary amine catalyst.

21. The process of claim 20, wherein the tertiary amine catalyst is selected from the group consisting of 4-phenyl propyl pyridine and 4-picoline.

22. The process of claim 10, wherein a tertiary amine catalyst is added to the foundry mix following the mixing of the polyisocyanate (b) with the foundry mix (a).

23. The process of claim 22, wherein the tertiary amine catalyst is selected from a group consisting of 4-phenyl propyl pyridine and 4-picoline.

24. The process of claim 22, wherein an organo-metallic co-catalyst is added to the tertiary amine catalyst.

* * * * *